(12) United States Patent
Mitoma et al.

(10) Patent No.: US 9,734,415 B2
(45) Date of Patent: Aug. 15, 2017

(54) OBJECT DETECTION SYSTEM

(71) Applicant: Hitachi Automotive Systems, Ltd., Hitachinaka-shi, Ibaraki (JP)

(72) Inventors: Hiroto Mitoma, Hitachinaka (JP); Seiya Kato, Tokyo (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 78 days.

(21) Appl. No.: 14/360,180

(22) PCT Filed: Nov. 5, 2012

(86) PCT No.: PCT/JP2012/078559
§ 371 (c)(1),
(2) Date: May 22, 2014

(87) PCT Pub. No.: WO2013/080745
PCT Pub. Date: Jun. 6, 2013

(65) Prior Publication Data
US 2015/0092988 A1 Apr. 2, 2015

(30) Foreign Application Priority Data

Nov. 30, 2011 (JP) .................................. 2011-262666

(51) Int. Cl.
*G06K 9/00* (2006.01)
*G08G 1/16* (2006.01)
(Continued)

(52) U.S. Cl.
CPC ......... *G06K 9/00805* (2013.01); *G01C 3/085* (2013.01); *G06K 9/20* (2013.01);
(Continued)

(58) Field of Classification Search
CPC . G06K 9/209; G06K 9/00805; G06K 9/00791
(Continued)

(56) References Cited

U.S. PATENT DOCUMENTS

2005/0004761 A1\* 1/2005 Takahama ............. G01S 17/936
701/301
2007/0021904 A1\* 1/2007 Kawamata ............. G08G 1/161
701/532
(Continued)

FOREIGN PATENT DOCUMENTS

JP 2002-032899 A 1/2002
JP 2003-061075 A 2/2003
(Continued)

OTHER PUBLICATIONS

Zehang Sun, George Bebis, and Ronald Miller, "Monocular Precrash Vehicle Detection: Features and Classifiers", IEEE Transactions on Image Processing, vol. 15, No. 7, Jul. 2006.\*
(Continued)

*Primary Examiner* — Stephen R Koziol
*Assistant Examiner* — Shaghayegh Azima
(74) *Attorney, Agent, or Firm* — Foley & Lardner LLP

(57) ABSTRACT

An object detection system including multiple detecting means identifies other-vehicle information data acquired by using the multiple detecting means, determines whether or not the other-vehicle information data acquired by using the multiple detecting means 105 and 107 are of the same vehicle to output the other-vehicle information data that can be applied to various control applications when the other-vehicle information data determined to be of the same vehicle are switched, selects either of the multiple other-vehicle information data determined to be of the same vehicle according to the other-vehicle information detecting accuracies of the detecting means 105 and 107, and switches the selected other-vehicle information data to another other-vehicle information in a transition period based on the relative speed and the relative position from the other vehicle.

11 Claims, 7 Drawing Sheets

(51) Int. Cl.
*G01C 3/08* (2006.01)
*G06K 9/20* (2006.01)

(52) U.S. Cl.
CPC ........ *G08G 1/166* (2013.01); *B60R 2300/105* (2013.01); *B60R 2300/107* (2013.01); *B60R 2300/8093* (2013.01)

(58) Field of Classification Search
USPC .......................................................... 382/104
See application file for complete search history.

(56) References Cited

U.S. PATENT DOCUMENTS

| | | | | |
|---|---|---|---|---|
| 2007/0168128 | A1* | 7/2007 | Tokoro | B60R 21/013 701/301 |
| 2008/0167819 | A1* | 7/2008 | Breed | G08G 1/161 701/300 |
| 2009/0265107 | A1* | 10/2009 | Matsuno | G08G 1/166 701/301 |
| 2010/0169015 | A1* | 7/2010 | Tsunekawa | G08G 1/166 701/300 |
| 2010/0226544 | A1* | 9/2010 | Uchida | B60R 1/00 382/107 |
| 2011/0267460 | A1* | 11/2011 | Wang | G06T 7/20 348/135 |
| 2012/0078498 | A1* | 3/2012 | Iwasaki | B60W 10/06 701/300 |
| 2012/0116663 | A1* | 5/2012 | Tsunekawa | G08G 1/166 701/300 |
| 2012/0133738 | A1* | 5/2012 | Hoffmeier | G08G 1/164 348/46 |
| 2012/0143486 | A1* | 6/2012 | Koike | G08G 1/163 701/301 |
| 2012/0176267 | A1* | 7/2012 | Nanami | G01S 13/426 342/107 |

FOREIGN PATENT DOCUMENTS

| | | |
|---|---|---|
| JP | 2005-258570 A | 9/2005 |
| JP | 2007-232410 A | 9/2007 |

OTHER PUBLICATIONS

International Search Report on application PCT/JP2012/078559 mailed Dec. 11, 2012; 3 pages.

* cited by examiner

OBJECT DETECTION SYSTEM

TECHNICAL FIELD

The present invention relates to an object detection system, and more particularly, to an object detection system mounted on a vehicle.

BACKGROUND ART

Various safety systems aiming at improving safety have been used in the automotive field.

In recent years, external recognition sensors for detecting objects around a vehicle that are an example of the safety systems are increasingly mounted. Examples of the external recognition sensors include stereo cameras and millimeter wave radars. Use of such safety systems allows detection of objects around a vehicle to alert the driver or perform cruise control depending on the detected surroundings so as to avoid collision of vehicles. Examples of methods for avoiding such collision include a method of detecting a vehicle in front by a stereo camera, alerting the driver if it is determined that the vehicles will collide on the basis of acquired relative speed and relative position between the vehicles, and applying an automatic brake if it is further detected that collision between the vehicles still cannot be avoided to reduce the impact of collision.

When a stereo camera is used, since an inter-vehicle distance or the like is calculated by using disparity information of the same vehicle captured on images acquired by two imaging means (cameras) thereof, there is a problem that the detectable is short and it is difficult to avoid collision when the relative speed is high. In contrast, since a mono camera detects a vehicle position on an image and can calculate an inter-vehicle distance from width information (number of pixels) on the detected image, an assumed width (1.7 m, for example) of a vehicle, and the characteristics of the camera and since the width of a vehicle on an image is larger than the disparity in general, the mono camera can detect an object such as a vehicle at a distance longer than the stereo camera. With the mono camera, however, there is a problem that error from the actual distance is caused when the assumption of the width of a vehicle for calculating the inter-vehicle distance is different from the actual width. In contrast, with the stereo camera, the inter-vehicle distance can be calculated from the disparity independent of the width of a vehicle, there is an advantage that error from the actual distance is less likely to be caused in a short distance range.

Thus, the distance between vehicles or the like can be calculated by a distance calculation technique for a mono camera by using an image acquired by one imaging means of a stereo camera, the distance is output in a long distance range that cannot be detected by the stereo camera while the distance between vehicles or the like obtained by using the accurate stereo camera at a shorter distance to increase the detection distance and allow collision between vehicles to be avoided even the relative speed between the vehicles is large.

When an error is caused in the inter-vehicle distance calculated by using the mono camera and there is thus a difference from the inter-vehicle distance calculated by using the stereo camera, and if the distance is simply switched between the distance calculated by using the mono camera and the distance calculated by using the stereo camera in performing cruise control or the like on the vehicle by using the distances to control the inter-vehicle distance, there is a problem that the inter-vehicle distance suddenly changes in a stepwise manner, which degrades the control result.

To address such problems, PTLS 1 and 2 disclose systems that switch vehicle information from information acquired by one detecting means to information acquired by another detecting means by taking a predetermined transition period to gradually make the vehicle information data converge.

CITATION LIST

Patent Literatures

PTL 1: JP 2005-258570 A
PTL 2: JP 2002-32899 A

SUMMARY OF INVENTION

Technical Problem

According to the systems disclosed in PTLS 1 and 2, taking the predetermined transition period to gradually switch the vehicle information in switching the vehicle information can prevent a sudden change in the inter-vehicle distance in a stepwise manner and allows vehicle control less uncomfortable of the driver even when an error is caused between the distances calculated by using different imaging means or detecting means.

With the systems disclosed in PTLS 1 and 2, however, since a predetermined fixed transition period is taken to make the vehicle information gradually converge, there is a problem that collision with a detected object (target such as another vehicle) may occur before completion of switching of the vehicle information and vehicle control may not be properly performed when the relative speed from the detected object is large. Specifically, when the distance between the subject vehicle and the detected object before switching the vehicle information from certain vehicle information to different vehicle information is longer than that after switching the vehicle information, the subject vehicle may determine that the detected object is located at a long distance even though the actual distance between the subject vehicle and the detected object is short, which may result in a delay in vehicle control and cause collision. If the transition period is shortened to overcome the delay in vehicle control, there is a problem that ACC control or the like when the relative speed between the subject vehicle and a detected object is small may be unnatural.

The present invention has been made in view of the aforementioned problems, and an object thereof is to provide an object detection system capable of properly address such opposing events as described above, properly switching vehicle information from certain vehicle information to different vehicle information, and properly perform vehicle cruise control.

Solution to Problem

In order to solve the problems described above, an object detection system according to the present invention includes: other-vehicle information acquiring means including multiple detecting means and being configured to acquire multiple other-vehicle information data by using the multiple detecting means; identifying means configured to identify the multiple other-vehicle information data acquired by the different detecting means of the other-vehicle information acquiring means according to a predetermined identification condition; and information selecting means configured to select either of the multiple other-vehicle information data determined to be of the same vehicle by the identifying means according to other-vehicle information detecting accuracies of the detecting means, wherein the information selecting means switches the other-vehicle information data to another other-vehicle information data determined to be of the same vehicle by the identifying means in a transition period based on a relative speed and a relative distance from the other vehicle.

Advantageous Effects of Invention

With the object detection system according to the present invention, for example, the period for switching the other-vehicle information acquired by using the detecting means can be made longer when the time to collision (TTC) obtained by dividing the relative distance by the relative speed is long, the period for switching the other-vehicle information acquired by using the detecting means can be shortened when the TTC is short, discomfort in vehicle control can be reduced in a control application such as ACC (auto cruise control) in which such discomfort is caused in vehicle control when a sudden change in the relative speed or the relative distance from a vehicle in front occurs, and target (another vehicle or the like) information for vehicle control can be provided without delay in a control application such as CMS (collision mitigation brake system) in which target information that is close to the actual value is immediately required.

Problems, features, and effects other than those described above will become apparent from the following description of embodiments.

BRIEF DESCRIPTION OF DRAWINGS

FIGS. 5(a) and 5(b) are diagrams illustrating examples of setting M and N in identification determination performed again after information data are determined to be of the same vehicle by the identifying means, in which FIG. 5(a) is a diagram in which the number of previous frames to be used in determination of the identification process performed again is made to be larger than N used when it is determined that the information data are of the same vehicle, and FIG. 5(b) is a diagram in which the number of Hits to be used in determination of the identification process performed again is made to be smaller than M used when it is determined that the information data are of the same vehicle.

DESCRIPTION OF EMBODIMENTS

An embodiment of an object detection system according to the present invention will be described below with reference to the drawings.

Figure 1:
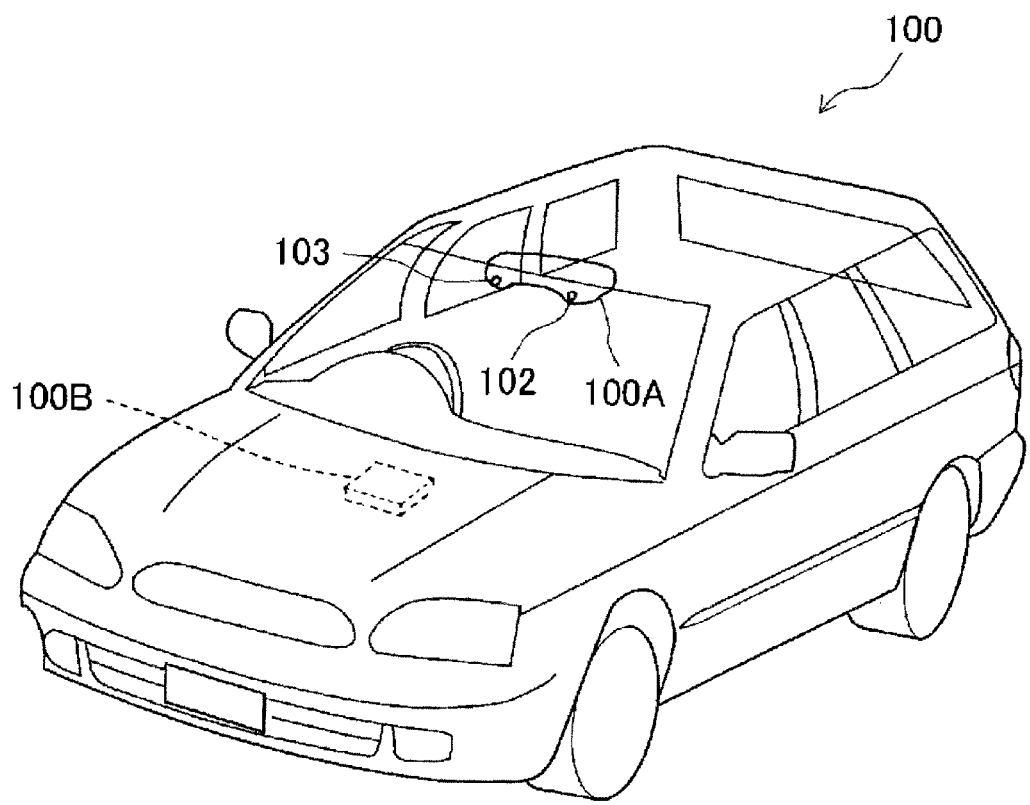
FIG. 1 is an overall perspective view schematically illustrating a vehicle to which an embodiment of an object detection system according to the present invention is applied.

FIG. 1 schematically illustrates a vehicle to which an embodiment of an object detection system according to the present invention is applied.

The illustrated vehicle 100 has an object detection system 101 (see FIG. 2) mounted thereon, in which two imaging means (cameras) 102 and 103 constituting the object detection system 101 are arranged facing forward of the vehicle 100 and in a row at predetermined positions (on a rearview mirror 100A in the figure) on the vehicle 100. Note that other means included in the object detection system 101 are contained in a microcomputer (not illustrated) in a control unit 100B mounted at a predetermined position on the vehicle 100. In addition, the two imaging means 102 and 103 and the control unit 100B are connected via a network (not illustrated) through which images captured by the imaging means 102 and 103 are transmitted to the control unit 100B.

Figure 2:
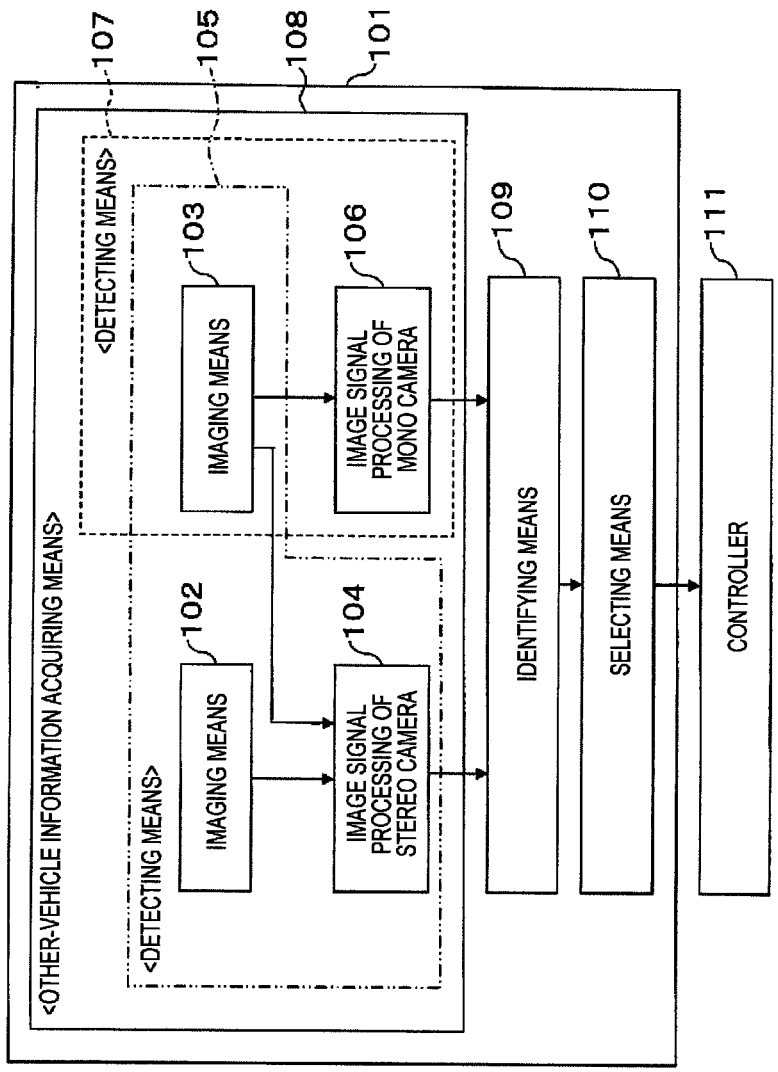
FIG. 2 is an overall configuration diagram illustrating an embodiment of an object detection system according to the present invention.

FIG. 2 is illustrates an embodiment of the object detection system according to the present invention. In the present embodiment, two imaging means (cameras) are used, and a plurality of detecting means used for acquiring other-vehicle information includes detecting means having one (mono camera) of the two imaging means and detecting means having the two imaging means (stereo camera).

The illustrated object detection system 101 mainly includes other-vehicle information acquiring means 108 configured to acquire other-vehicle information from the two respective detecting means 105 and 107, identifying means 109 configured to determine (identify) whether or not other-vehicle information data acquired by different detecting means 105 and 107 of the other-vehicle information acquiring means 108 are those of the same vehicle on the basis of a predetermined identifying condition, and selecting means 110 configured to select either of the other-vehicle information data (such as relative velocity or relative position) from the two detecting means 105 and 107 determined to be of the same vehicle by the identifying means 109 on the basis of the detection accuracies of the detecting means 105 and 107 and to switch the other-vehicle information data selected on the basis of the other-vehicle information and the detection accuracies of the detecting means 105 and 107 to the other other-vehicle information data determined to be of the same vehicle by the identifying means 109. Note that the detecting means 105 of the other-vehicle information acquiring means 108 includes the two imaging means 102 and 103 and image signal processing of stereo camera 104, and the detecting means 107 includes the imaging means 103 and image signal processing of mono camera 106. The other-vehicle information data selected by the selecting means 110 is transmitted to a controller 111 and used for vehicle control or the like to avoid collision or the like.

The detecting means 105 acquires two images by the two imaging means 102 and 103, and transmits the two images to the image signal processing of stereo camera 104, which in turn extracts the position of the vehicle traveling in front of the subject vehicle on the image from each of the two images, and measures the distance between the subject vehicle and the vehicle in front by using the principle of triangulation or the like on the basis of the disparity between the two images at the extracted position of the vehicle. Furthermore, a relative speed between the vehicles is calculated from a differential value of a previous value and a current value of the relative distance between the vehicles thus calculated or the magnifications of a previous vehicle image and a current vehicle image and the inter-vehicle distance, or the like. For measuring the distance from the subject vehicle to the other vehicle by using the principle of triangulation or the like, the disparity between images of the same vehicle from the two imaging means 102 and 103 can be used to calculate the distance from the subject vehicle 100 to the other vehicle traveling in front thereof.

The detecting means 107 acquires one image by one imaging means 103, and transmits the images to the image signal processing of mono camera 106, which in turn extracts the position of the vehicle traveling in front of the subject vehicle from the image, and locates the position of the other vehicle relative to the subject vehicle by assuming that the width of the extracted vehicle is a width (1.7 m, for example) of a typical vehicle and using the similarity on the basis of the width of the vehicle, the focal length of the camera, and the image pixel size on the acquired image of the vehicle. Furthermore, similarly to the detecting means 105, a relative speed between the vehicles is calculated from a differential value of a previous value and a current value of the relative distance between the vehicles thus calculated or the magnifications of a previous vehicle image and a current vehicle image and the inter-vehicle distance, or the like.

Since the detecting means 105 calculates the distance from the subject vehicle to the other vehicle from the disparity of images, the disparity is large and the error from the actual inter-vehicle distance is thus small at a short distance. At a long distance from the subject vehicle to the other vehicle, however, the disparity is very small and thus the error from the actual inter-vehicle distance becomes too large. Thus, the detecting means 105 using the stereo camera is not typically applied to distance measurement at a long distance.

On the other hand, since the detecting means 107 calculates the distance from the subject vehicle to the other vehicle from the width on an image, the inter-vehicle distance can be measured in a range in which the vehicle can be located on the image even when the distance from the subject vehicle to the other vehicle is long. Since, however, the detecting means 107 assumes the width of a vehicle, the distance from the subject vehicle to the other vehicle is calculated to be a shorter distance than the actual distance when the other vehicle has a smaller width than the assumed width, or calculated to be a longer distance than the actual distance when the other vehicle has a larger width than the assumed width, for example. Thus, the detecting means 107 tends to cause a larger error from the actual inter-vehicle distance than the detecting means 105 described above.

Figure 3:
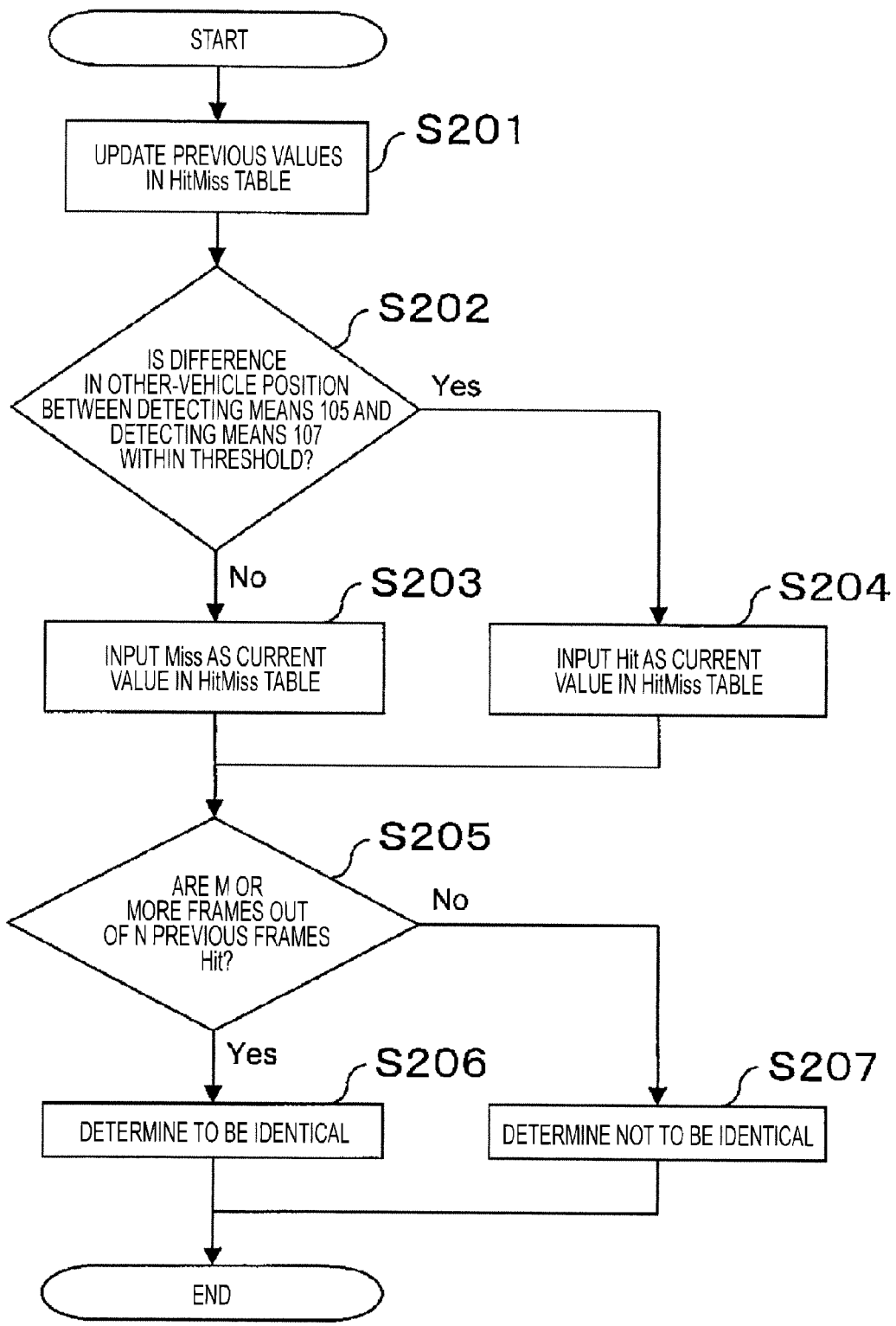
FIG. 3 is a flowchart illustrating processing performed by identifying means of the object detection system illustrated in FIG. 2.

FIG. 3 illustrates a processing flow of the identifying means 109 of the object detection system 101 illustrated in FIG. 2, in which the identifying means 109 determines whether or not respective other-vehicle information data on the position and the relative speed of a vehicle in front of the subject vehicle acquired from the detecting means 105 and 107 having different characteristics as described above are of the same vehicle.

Figure 4:
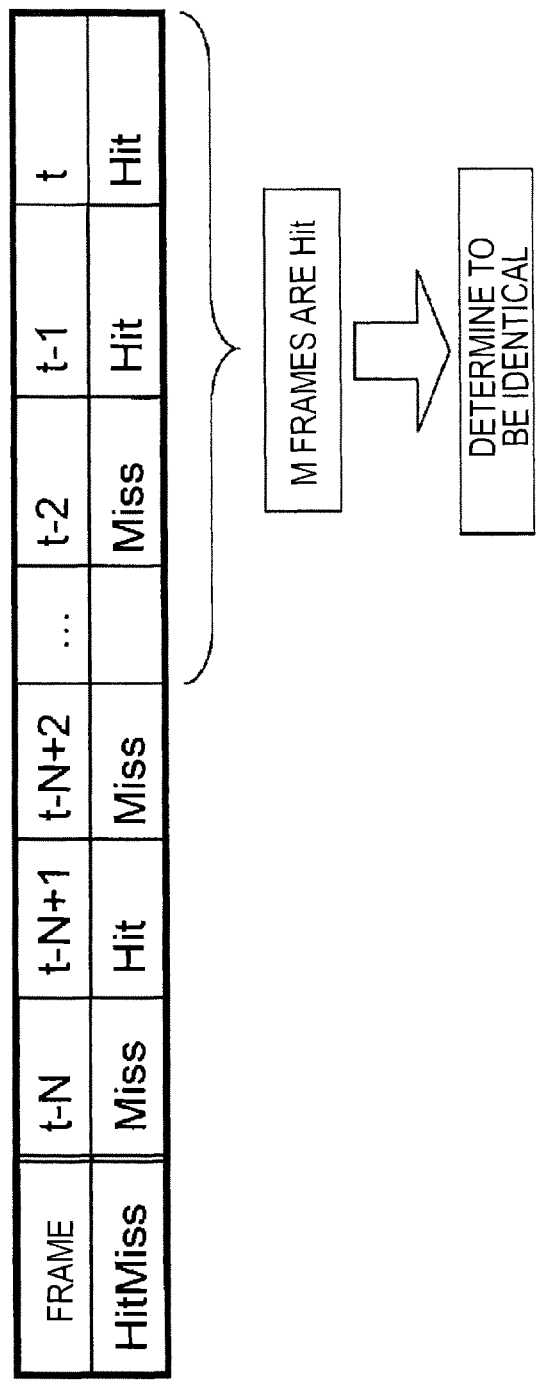
FIG. 4 is a diagram illustrating a basic structure of a HitMiss table.

Specifically, first, a HitMiss table (buffer) as illustrated in FIG. 4 for holding HitMiss values indicating whether or not the respective other-vehicle information data on the distance and the relative speed of the other vehicle transmitted from the detecting means 105 and 107 in a size of previous N frames match with each other by using Hit (matched) or Miss (mismatched) is provided. Note that the frame interval of the HitMiss table may be a processing period of the detecting means, for example. Subsequently, it is determined whether or not the difference between the position or the like of the other vehicle (a lateral position of the center or the width of the other vehicle on the image, for example) on the image calculated by the detecting means 105 and the position or the like of the other vehicle on the image calculated by the detecting means 107 is within a threshold (obtained experimentally) (S202). For example, when a measurement error of the stereo camera is represented by $\alpha$ (m) and a measurement error of the mono camera is represented by $\beta$ (m), it is determined whether or not the difference in the position of the other vehicle is $-\alpha-\beta$ (m) (lower threshold limit) or larger and $\alpha+\beta$ (m) (upper threshold limit).

If the difference is within the threshold, Hit is input to the current value (present value) in the HitMiss table for the position of the other vehicle (S204). If the difference is not within the threshold, Miss is input to the current value (present value) in the HitMiss table for the position of the other vehicle (S203). Note that, for inputting HitMiss values for a next frame in the HitMiss table, all the previous values are shifted by one previous frame to update the HitMiss table and the current value is then input into the HitMiss table (S201). Thus, the history of Hits and Misses for previous N frames is saved in the HitMiss table. A threshold is similarly provided for the relative speed between the vehicles and the history of Hits and Misses for previous N frames is saved in the HitMiss table.

It is determined whether or not the number frames with Hits is M (obtained experimentally) or more out of N previous frames for each of the HitMiss tables for the position and the relative speed of the other vehicle on the image created according to the procedures described above (S205). If it is determined that M or more frames are with Hits, the other-vehicle information data from the respective detecting means 105 and 107 are determined to be of the same other vehicle (S206). If the number of frames with Hits is smaller than M, the other-vehicle information data from the respective detecting means 105 and 107 are determined not to be of the same other vehicle (S207). As a result, even if there is a frame from which the other vehicle cannot be detected owing to noise (such as a shadow or a droplet) or the like, the determination can be made considering the HitMiss values of the previous N frames, which allows the identification process robust to noise. Note that the base numbers of M and N can be set for each HitMiss table.

In practice, when a stereo camera or a mono camera is used, missing data that cannot be detected due to noise or the like as mentioned above can be covered by tracking between frames captured by the camera. Furthermore, in the present embodiment, since the imaging means 103 is used in common by the detecting means 105 and 107 and it is very rare that different vehicles appear on the same position on the images, the determination on whether or not the other-vehicle information data are of the same other vehicle can be made with M=1 and N=1 and on the basis of the current frame only for simplification of the identification process. In contrast, when different imaging means are used, detected objects may be different and values of M and N need to be obtained experimentally to maintain the determination accuracy.

If it is determined again whether or not the other-vehicle information data are of the same other vehicle by using the same values of M and M as the identification process when the other vehicle has gone farther from the subject vehicle and reaches a distance that can be obtained by the image signal processing of stereo camera 104 after it is once determined that the other-vehicle information data are of the same other vehicle, for example, the determination result of the other-vehicle information data may be continuously switched between the determination to be of the same vehicle and the determination not to be of the same vehicle at about the distance a that cannot be obtained by the image signal processing of stereo camera 104 any more. Thus, in the present embodiment, values of M and N are additionally provided for determining that the other-vehicle information data are not of the same vehicle in determination of the identification process performed again after the other-vehicle information data are once determined to be of the same vehicle, and used in the determination of the identification process.

Figure 5:
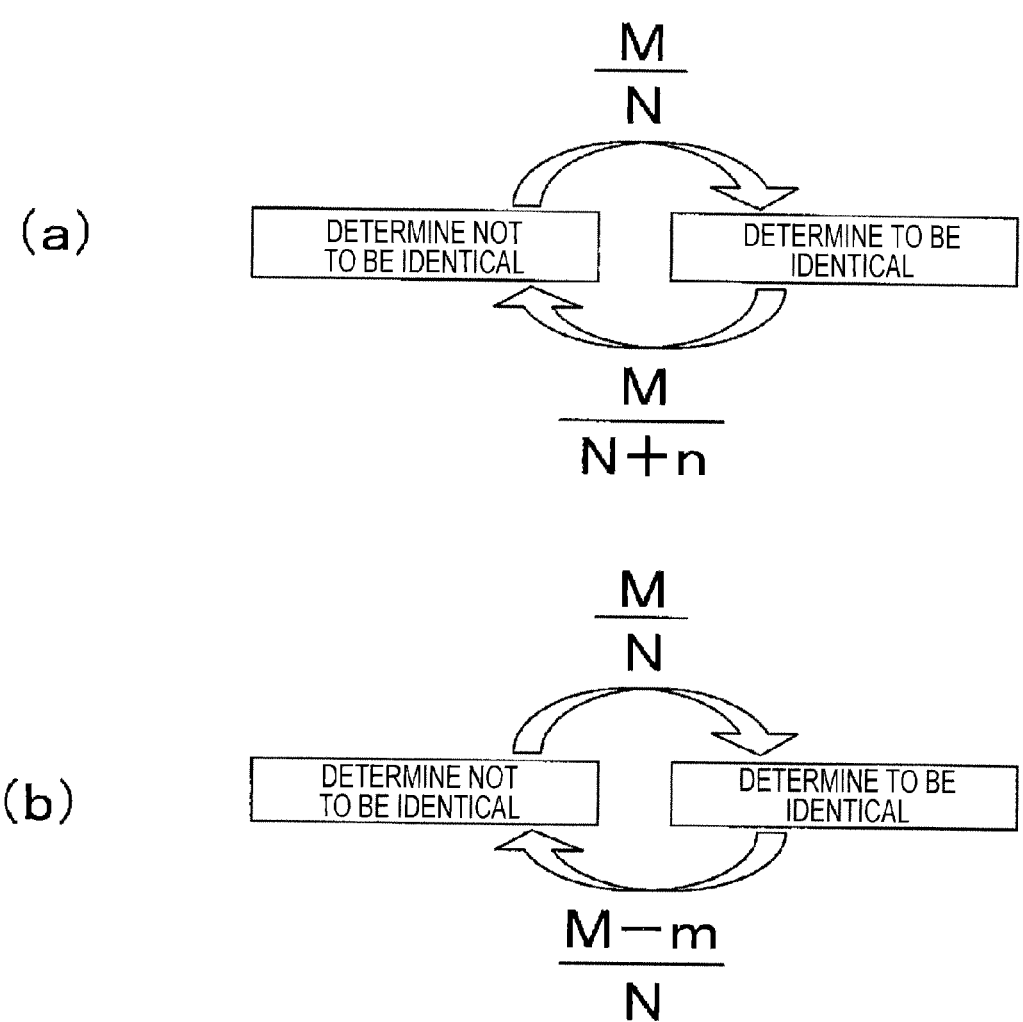

Specifically, in the identification process performed again after the other-vehicle information data are once determined to be of the same vehicle, the value of N of previous frames used in the determination is made to be larger than that used when it is determined that the other-vehicle information data are determined to be of the same vehicle without changing the number M of Hits, for example (see FIG. 5(a)). Alternatively, the number of Hits to be used in the determination performed again is made to be smaller than M used when it is determined that the other-vehicle information data are determined to be of the same vehicle without changing the number N of frames, for example (see FIG. 5(b)). As a result, the determination of the identification process can be made with hysteresis to allow control of continuous switching of the determination result. For example, when M and N are both set to "1" when it is determined that the other-vehicle information data are of the same vehicle as described above, the value of Nat which it is determined that the other-vehicle information data are not of the same vehicle can be set to "5" to obtain the relative distance between the vehicle by using only the image signal processing of mono camera 106 at too long a distance for the image signal processing of stereo camera 104 to accurately obtain the relative distance between the vehicles, which allows easy control of continuous switching of the determination result.

The other-vehicle information data that are not determined to be of the same vehicle in the end of the identification process described above, that is, the other-vehicle information data that are detected only by one of the detecting means 105 and 107 are passed to the next process as unidentified other-vehicle information.

The selecting means 110 illustrated in FIG. 2 selects either one of the other-vehicle information data on the relative distance and the relative position between the subject vehicle and the other vehicle acquired from the different detecting means 105 and 107 and determined to be of the same vehicle by the identifying means 109 according to the accuracies of detecting the other-vehicle information by the detecting means 105 and 107.

Referring to the accuracy of the relative position between vehicles obtained by the image signal processing of stereo camera 104 and that obtained by the image signal processing of mono camera 106, the accuracy of the relative position calculated by the image signal processing of stereo camera 104 is relatively higher than that calculated by the image signal processing of mono camera 106 as described above. Thus, when the relative position calculated by the image signal processing of stereo camera 104 and that calculated by the image signal processing of mono camera 106 are both present, the selecting means 110 selects the relative position calculated by the image signal processing of stereo camera 104. Furthermore, also for the relative speed between the subject vehicle and the other vehicle, since the relative speed between vehicles is calculated from the relative position, the accuracy of the relative speed calculated by the image signal processing of stereo camera 104 is relatively higher than that calculated by the image signal processing of mono camera 106. Thus, when the relative speed calculated by the image signal processing of stereo camera 104 and that calculated by the image signal processing of mono camera 106 are both present, the selecting means 110 selects the relative speed calculated by the image signal processing of stereo camera 104. The selected other-vehicle information data on the relative position and the relative speed are then transmitted to the controller 111.

Note that the selecting means 110 does not perform the selection process on the unidentified other-vehicle information and transmits the same to the controller 111.

When the other vehicle has gone further out of the range in which the image signal processing of stereo camera 104 can obtain an inter-vehicle distance, the other-vehicle information selected by the selecting means 110 is switched from the relative distance calculated by the image signal processing of stereo camera 104 to that calculated by the image signal processing of mono camera 106, or when the other vehicle has come closer into the range in which the image signal processing of stereo camera 104 can obtain an inter-vehicle distance, the other-vehicle information selected by the selecting means 110 is switched from the relative distance calculated by the image signal processing of mono camera 106 to that calculated by the image signal processing of stereo camera 104. Thus, in the object detection system 101 according to the present embodiment, the time to collision (TTC) is calculated from the relative speed and the relative distance calculated by the image signal processing of stereo camera 104, and the period (also referred to as a switching period or a transition period) for switching the other-vehicle information from one other-vehicle information data to another other-vehicle information data is set according to the duration of the TTC. Note that the time to collision (TTC) can be obtained by dividing the relative distance by the relative speed.

Figure 6:
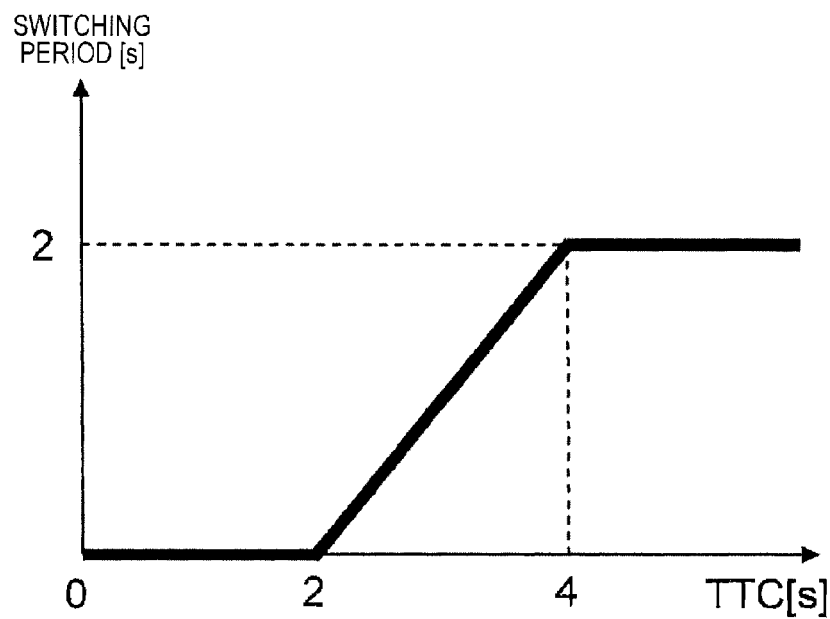
FIG. 6 is a graph illustrating an example of a period for switching other-vehicle information.

FIG. 6 illustrates an example of the period for switching the other-vehicle information.

As illustrated, the period for switching the other-vehicle information is made longer if the calculated TTC is longer than a predetermined value even when the vehicles are getting closer to each other or if the vehicles goes father from each other, and the period for switching the other-vehicle information is made shorter if the calculated TTC is shorter than a predetermined value. For example, when the time required for vehicle control determination is assumed to be two seconds, and if the TTC is two seconds or shorter, the other-vehicle information is readily switched to proper other-vehicle information, that is, the period for switching the other-vehicle information is set to 0 seconds. Furthermore, when the relative speed is high or the relative distance is short, the value of N used by the identifying determining means 109 can be made smaller to shorten the period required for the identification process. In contrast, if the TTC is two seconds or longer, the other-vehicle information is switched to proper other-vehicle information during a transition period obtained by subtracting two seconds from the TTC, that is, the period obtained by subtracting two seconds from the TTC is set to the switching period. Furthermore, if the switching period is too long, the convergence to the relative distance calculated by the image signal processing of stereo camera 104 is delayed; the period for switching the other-vehicle information is therefore set to two seconds at the longest. When the vehicles go farther from each other (the TTC is a negative value), the influence on vehicle control is so small that the period for switching the other-vehicle information can be made constant at two seconds.

Description will be made on a specific method for switching the other-vehicle information with reference to FIG. 7. With the object detection system 101 according to the present embodiment, when the relative distance calculated by the image signal processing of stereo camera 104 is represented by Dst, the relative distance calculated by the image signal processing of mono camera 106 is represented by Dmo, the switching period (transition period) is represented by Tc, the switching start time is represented by T0, and the current time is represented by T, an interpolation relative distance Dip for interpolation of the distance between the relative distances calculated by the image signal processing of stereo camera 104 and the image signal processing of mono camera 106 and a final output relative distance Dout to be ultimately used for vehicle control or the like are output on the basis of the following expressions (1) and (2).

[Expression 1]

$$Dip=\{1-(T-T0)/Tc\}\times(Dmo[T0]-Dst[T0]) \quad (1)$$

[Expression 2]

$$Dout=Dst[T]+Dip \quad (2)$$

Note that Dmo [T0] and Dst [T0] represent the relative distances Dmo and Dst, respectively, at time T0, and Dst [T] represents the relative distance Dst at time T. As illustrated, since the relative distance between vehicles is long before the switching start time T0, the relative distance is not calculated by the image signal processing of stereo camera 104 using the stereo camera.

Figure 7:
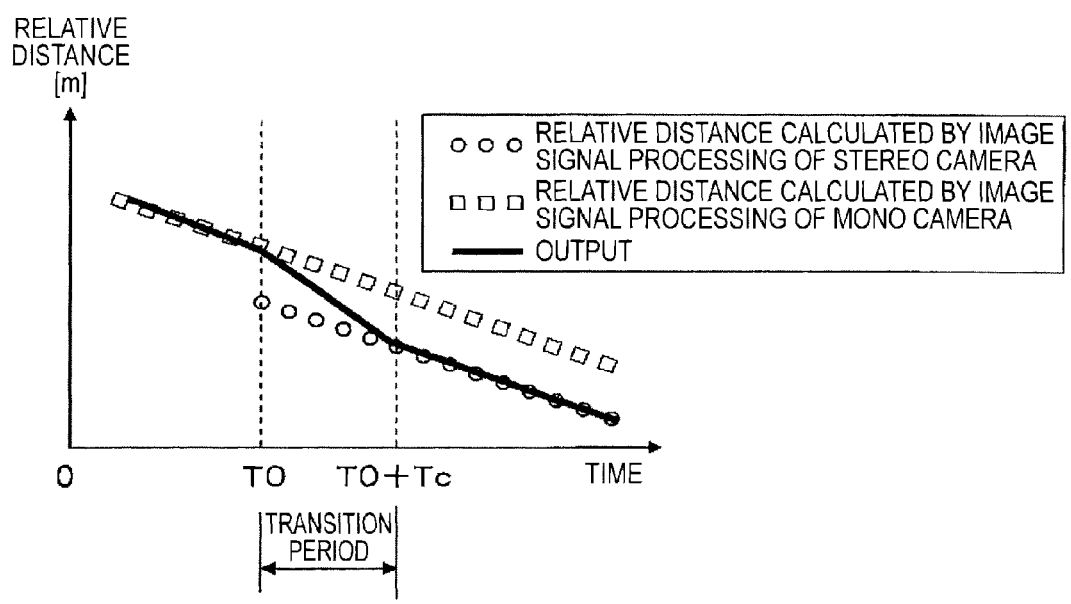
FIG. 7 is a graph illustrating an example of an output result when relative speed from the other vehicle is low.

According to the expressions (1) and (2) described above, when time T changes from T0 to T0+Tc, the interpolation relative distance Dip changes from Dmo [T0]−Dst [T0] to 0, and the final output relative distance Dout gradually changes from Dmo [T0] to Dst [T0+Tc] during the switching period (transition period) Tc as illustrated in FIG. 7.

Note that the final output relative distance Dout is transmitted to the controller 111 and used in vehicle control or the like. Furthermore, similar processing is performed on the relative speed, and a final output relative speed Vout to be used in vehicle control or the like is transmitted to the controller 111.

With such a configuration, when the TTC is relatively long, for example, the other-vehicle information can be switched from the relative distance calculated by the image signal processing of mono camera 106 to that calculated by the image signal processing of stereo camera 104 as illustrated in FIG. 7, and information without sudden fluctuation of the relative distance or the relative speed can be transmitted to controller 111, which allows vehicle control less uncomfortable for the driver.

Figure 8:
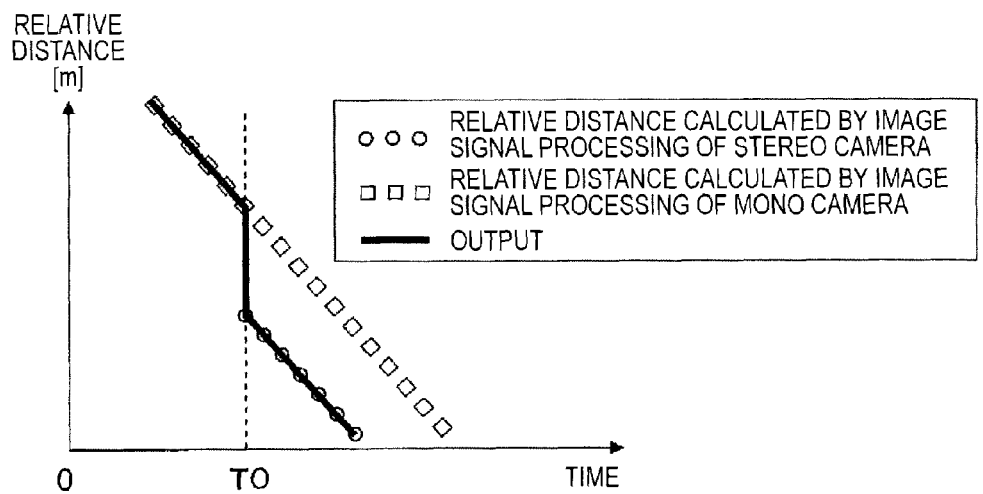
FIG. 8 is a graph illustrating an example of an output result when relative speed from the other vehicle is high and relative distance calculated by image signal processing of mono camera is relatively longer.

When the TTC is relatively short, on the other hand, the other-vehicle information can be readily switched as illustrated in FIG. 8 (in the figure, the other-vehicle information is switched from the relative distance calculated by the image signal processing of mono camera 106 at time T0 to the relative distance calculated by the image signal processing of stereo camera 104) by setting the period (transition period) for switching the other-vehicle information to 0 seconds as described with reference to FIG. 6, which allows transmission of information with good responsiveness and without delay due to the switching to the controller 111 and vehicle control without delay with respect to collision or the like.

Figure 9:
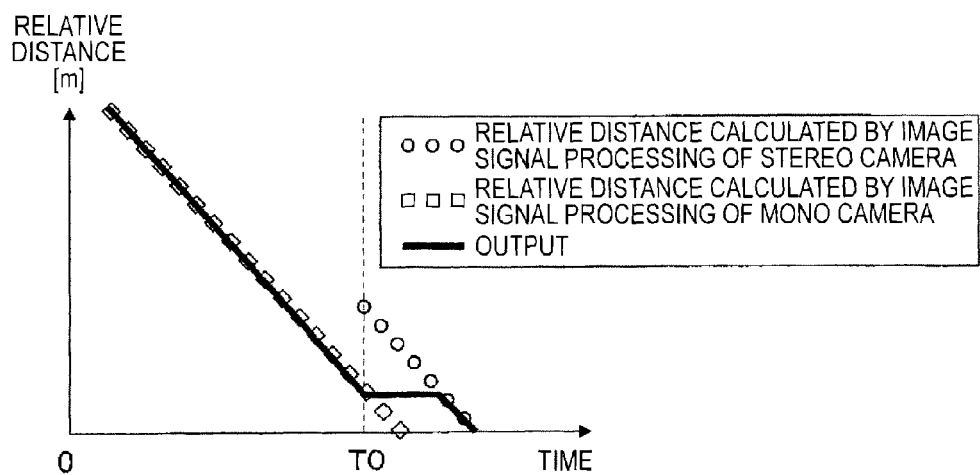
FIG. 9 is a graph illustrating an example of an output result when relative speed from the other vehicle is high and relative distance calculated by the image signal processing of mono camera is relatively shorter.

Furthermore, in switching the other-vehicle information from the relative distance calculated by the image signal processing of mono camera 106 to that calculated by the image signal processing of stereo camera 104, if the relative distance calculated by the image signal processing of mono camera 106 is shorter than that image signal processing of stereo camera 104, the relative distance calculated by the image signal processing of mono camera 106 at the time (T0) when switching of the other-vehicle information is started is continuously output until the relative distance calculated by the image signal processing of stereo camera 104 becomes shorter than the relative distance calculated by the image signal processing of mono camera 106 at the switching start time (T0) as illustrated in FIG. 9. As a result, it is possible to prevent determination that the relative distance between vehicles has suddenly increased and temporary cancellation of vehicle control.

As described above, according to the object detecting means 101 according to the present embodiment, the period for switching other-vehicle information data acquired by a plurality of detecting means and determined to be of the same vehicle by the identifying means can be made longer when the TTC is longer than a predetermined value, whereas the period for switching other-vehicle information data acquired by a plurality of detecting means and determined to be of the same vehicle by the identifying means can be made shorter when the TTC is shorter than the predetermined value, which can reduce discomfort of vehicle control in a control application such as ACC in which such discomfort is caused in vehicle control when a sudden change in the relative speed or the relative distance from a vehicle in front occurs and which can provide target (another vehicle or the like) information for vehicle control without delay in a control application such as CMS in which target information close to the actual value is immediately required.

Although an embodiment in which a stereo camera and a mono camera are used as a plurality of detecting means is described in the present embodiment, the detecting means are not limited thereto and may be detecting means using a difference in position between vehicles each having a GPS and communication equipment or detecting means such as millimeter wave radars, for example.

Furthermore, although an embodiment in which two detecting means are used as the detecting means is described in the present embodiment, three or more detecting means may be applied in which proper other-vehicle information can be selected according to the accuracies of detecting other-vehicle information of the respective detecting means and used in vehicle control.

Furthermore, although it is stated that the values of M and N at the identifying means 109 can be set to M=1 and N=1 with which determination to be of the same vehicle can be readily made by applying the detecting means including the image signal processing of stereo camera 104 and the image signal processing of mono camera 106 that use the imaging means 103 in common in the present embodiment, the values of M and N used at the identifying means can also be changed according to the relative speed and/or the relative position similarly to the switching period when detecting means having significantly different characteristics such as a millimeter wave radar and a mono camera. For example, experimentally optimal values are used for M and N when the TTC calculated from the relative speed and the relative distance is long, whereas smaller values than the experimentally optimal values are used for M and N when the TTC is short. As a result, it is possible to readily determine whether or not other-vehicle information data are of the same other vehicle and to promptly transmit the determination result to the controller 111, which can further increase the responsiveness of vehicle control.

Note that the present invention is not limited to the embodiments described above but includes various modifications. For example, the embodiments described above are presented in detail to provide easier understanding of the present invention, and are not necessarily limited to those including all the described components. Furthermore, some of components of a certain embodiment may be replaced by components of another embodiment, and a component of a certain embodiment may be added to the configuration of another embodiment. Still further, some of the components of each embodiment may be added to, deleted from or replaced with other components.

The components, functions, processors, processing means, and the like described above may be partially or entirely realized by hardware such as through design using integrated circuits. The components, functions and the like described above may be realized by software by interpreting and executing programs for implementing the respective functions by a processor. Information such as programs, tables, and files for implementing the functions may be stored in storage devices such as a memory, a hard disk, and an SSD (solid state drive), of storage mediums such as an IC card, an SD card, and a DVD.

Furthermore, the illustrated control lines and information lines are those considered to be needed for the description but are not necessarily represent all the control lines and information lines required in a product. It may be deemed that almost all the components are actually interconnected.

REFERENCE SIGNS LIST

101: object detection system
102, 103: imaging means
104: image signal processing of stereo camera
105, 107: detecting means
106: image signal processing of mono camera
108: other-vehicle information acquiring means
109: identifying means
110: selecting means
111: controller

The invention claimed is:

1. An object detection system comprising:
an other-vehicle information acquirer including multiple detectors and being configured to acquire multiple other-vehicle information data by using the multiple detectors;
an identifier configured to identify the multiple other-vehicle information data acquired by the multiple detectors of the other-vehicle information acquirer according to a predetermined identification condition; and
an information selector configured to select either of the multiple other-vehicle information data determined to be of the same vehicle by the identifier according to other-vehicle information detecting accuracies of the detectors, wherein
the information selector is configured to switch the other-vehicle information data to another other-vehicle information data determined to be of the same vehicle by the identifier in a transition period based on a relative speed and a relative distance from the other vehicle, and
the transition period based on the relative speed and the relative distance from the other vehicle is a period based on a time to collision obtained by dividing the relative distance by the relative speed.

2. The object detection system according to claim 1, wherein the identifier is configured to change the identification condition according to the relative speed and/or the relative distance from the other vehicle.

3. The object detection system according to claim 1, wherein the multiple detectors at least include a mono camera and a stereo camera.

4. The object detection system according to claim 2, wherein the multiple detectors at least include a mono camera and a stereo camera.

5. The object detection system according to claim 1, wherein the identifier is configured:
to determine a hit occurs if the difference between the distance from the vehicle to another vehicle determined by one of the detectors and the distance from the vehicle to another vehicle determined by another of the detectors is less than a threshold,
to determine a miss occurs if the difference between the distance from the vehicle to another vehicle determined by the one of the detectors and the distance from the vehicle to the another vehicle determined by the another of the detectors is greater than the threshold,
to save the history of hits and misses for a previous N frames,
to determine that the other-vehicle information data are of the same other vehicle if a predetermined M or more frames of the N frames are hits, and
to determine that the other-vehicle information data is not of the same other vehicle if less than the predetermined M frames of the N frames are hits.

6. The object detection system according to claim 5, wherein the identifier is configured:
if the other-vehicle information data is determined to be of the same other vehicle, increasing the value of N while keeping the value of M the same, and determining whether or not other-vehicle information data are of the same other vehicle based on the increased value of N and on M, or
if the other-vehicle information data is determined to be of the same other vehicle, decreasing the number of hits to be less than M, while keeping the value of N the same, and determining whether or not other-vehicle information data are of the same other vehicle based on the decreased value of hits and on N.

7. The object detection system according to claim 6, wherein the information selector is configured to, when the time to collision is greater than a time to collision threshold, switch the other-vehicle information data from a relative distance from the other vehicle calculated by one of the multiple detectors to a relative distance from the other vehicle calculated by another of the multiple detectors.

8. The object detection system according to claim 6, wherein if the relative distance calculated by the one detector is shorter than the relative distance calculated by the another detector, the information selector is configured such that the relative distance calculated by the one detector at a time when switching the other-vehicle information data is started is continuously output until the relative distance calculated by the another detector becomes shorter than the relative distance calculated by the one detector.

9. The object detection system according to claim 1, wherein the identifier is configured:
- to determine a hit occurs if the difference between the distance from the vehicle to another vehicle determined by one of the detectors and the distance from the vehicle to another vehicle determined by another of the detectors is less than a threshold,
- to determine a miss occurs if the difference between the distance from the vehicle to another vehicle determined by the one of the detectors and the distance from the vehicle to the another vehicle determined by the another of the detectors is greater than the threshold,
- to save the history of hits and misses for a previous N frames, wherein M is a number of the N frames corresponding to hits,
- if the other-vehicle information data is determined to be of the same other vehicle, increasing the value of N while keeping the value of M the same, and determining whether or not other-vehicle information data are of the same other vehicle based on the increased value of N and on M, or
- if the other-vehicle information data is determined to be of the same other vehicle, decreasing the number of hits to be less than M, while keeping the value of N the same, and determining whether or not other-vehicle information data are of the same other vehicle based on the decreased value of hits and on N.

10. The object detection system according to claim 9, wherein the information selector is configured to, when the time to collision is greater than a time to collision threshold, switch the other-vehicle information data from a relative distance from the other vehicle calculated by one of the multiple detectors to a relative distance from the other vehicle calculated by another of the multiple detectors.

11. The object detection system according to claim 10, wherein if the relative distance calculated by the one detector is shorter than the relative distance calculated by the another detector, the information selector is configured such that the relative distance calculated by the one detector at a time when switching the other-vehicle information data is started is continuously output until the relative distance calculated by the another detector becomes shorter than the relative distance calculated by the one detector.

* * * * *